United States Patent

Breuer et al.

[11] 3,898,219
[45] Aug. 5, 1975

[54] (α-CYANAMINO)ACETAMIDOCEPHALOSPORINS

[75] Inventors: Hermann Breuer, Regensburg, Germany; Joseph Edward Dolfini, Princeton, N.J.; Raymond C. Erickson, Cincinnati, Ohio; William L. Parker, Pennington, N.J.

[73] Assignee: E. R. Squibb & Sons, Inc., Princeton, N.J.

[22] Filed: Dec. 10, 1973

[21] Appl. No.: 423,384

Related U.S. Application Data

[62] Division of Ser. No. 200,605, Nov. 19, 1973, Pat. No. 3,796,709.

[52] U.S. Cl............................. 260/243 C; 424/246
[51] Int. Cl.²......................................... C07D 501/20
[58] Field of Search ............................... 260/243 C

[56] References Cited
UNITED STATES PATENTS

| 3,741,963 | 6/1973 | Dursch et al..................... 260/243 C |
| 3,821,209 | 6/1974 | Arnold et al..................... 260/243 C |

*Primary Examiner*—Nicholas S. Rizzo
*Attorney, Agent, or Firm*—Lawrence S. Levinson; Merle J. Smith

[57] ABSTRACT

New (α-cyanamino)acetamidocephalosporins of the following general formula, and their salts

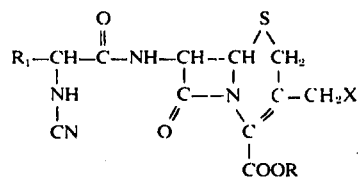

wherein R is hydrogen, lower alkyl, aralkyl, tri(lower alkyl)silyl, a salt forming ion or the group -CH$_2$-O-C-R$_2$;

R$_1$ is hydrogen, lower alkyl, lower alkenyl, cyclo-lower alkyl, unsaturated cyclo-lower alkyl, adamantyl, aryl, aralkyl or a heterocyclic group;

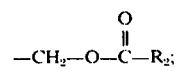

R$_2$ is lower alkyl, aryl or aralkyl and X is hydrogen, hydroxy, lower alkanoyloxy, aroyloxy, aralkanoyloxy, the radical of a nitrogen base, a quaternary ammonium radical or together X and R represent a bond linking carbon and oxygen in a lactone ring; are useful as antibacterial agents.

10 Claims, No Drawings

(α-CYANAMINO) ACETAMIDOCEPHALOSPORINS

This application is a division of application Ser. No. 200,605, filed Nov. 19, 1973, U.S. Pat. No. 3,796,709 issued Mar. 12, 1974.

SUMMARY OF THE INVENTION

This invention relates to new antibacterial (α-cyanamino)acetamidocephalosporins of the formula

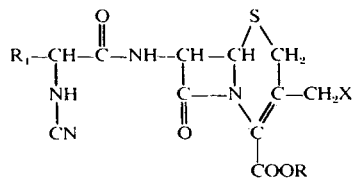

R represents hydrogen, lower alkyl, tri(lower alkyl)silyl, aralkyl, a salt forming ion or the group

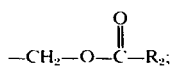

$R_1$ represents hydrogen, lower alkyl, cyclo-lower alkyl, unsaturated cyclo-lower alkyl, adamantyl, aryl, aralkyl or a heterocyclic group; $R_2$ represents lower alkyl, aryl or aralkyl; X is hydrogen, hydroxy, lower alkanoyloxy, aroyloxy, aralkanoyloxy, the radical of a nitrogen base or a quaternary ammonium radical. In addition X and R may represent a bond linking carbon and oxygen in a lactone ring.

The preferred members within each group are as follows: R is hydrogen, lower alkyl or alkali metal, especially hydrogen, methyl, pivaloyloxy, sodium or potassium; $R_1$ is phenyl, 1,4-cyclohexadienyl, pyridyl, pyrrolidyl, morpholino, thienyl furyl, oxazolyl, isoxazolyl, thiazolyl, especially phenyl and most especially 1,4-cyclohexadienyl; $R_2$ is lower alkyl, preferably methyl or t-butyl.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain for example, methyl, ethyl, propyl, isopropyl, butyl, isobutyl, t-butyl, amyl or the like. The lower alkenyl groups are double bonded, monounsaturated hydrocarbon radicals of the same type, the two to four carbon members being preferred.

The cyclo-lower alkyl groups included cycloaliphatic groups having three to seven carbons in the ring such as cyclopropyl, cyclobutyl, cyclopentyl, cyclohexyl and cycloheptyl. The cyclic groups may also be cycloalkenyl and cycloalkadienyl groups of the same type, e.g., cyclobutenyl, cyclopentenyl, cyclohexenyl, cyclopentadienyl, cyclohexadienyl, etc. The double bond or bonds may be variously located. In addition, cycloheptatrienyl is included. A particularly preferred radical, as discussed later, is the 1,4-cyclohexadienyl group. These may be simply substituted with one to three groups such as halogen, lower alkyl or lower alkoxy.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, lower alkanoyl or lower alkanoyloxy. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl and p-hydroxyphenyl.

Both 1-adamantyl and 2-adamantyl groups are included, but the first is preferred.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above to form a bond linking carbon and oxygen in a lactone ring.

The heterocyclic groups represented by $R_1$ are 5- to 6-membered monocyclic heterocyclic radicals (exclusive of hydrogen) containing nitrogen, sulfur or oxygen in the ring in addition to carbon (not more than two hetero atoms), and members of this group simply substituted as discussed above with respect to the aryl groups. The heterocyclic radicals include, for example, pyridyl, pyrrolidyl, morpholinyl, thienyl, furyl, oxazolyl, isoxazolyl, thiazolyl and the like, as well as the simply substituted members, especially the halo, lower alkyl (particularly methyl and ethyl) lower alkoxy (particularly methoxy and ethoxy), phenyl and hydroxy-lower alkyl (particularly hydroxymethyl and hydroxyethyl) substituted members.

The salt forming ions may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

Preferred groups of compounds are those having the formulas

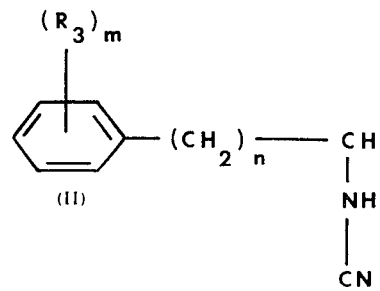

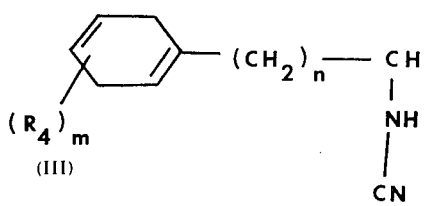

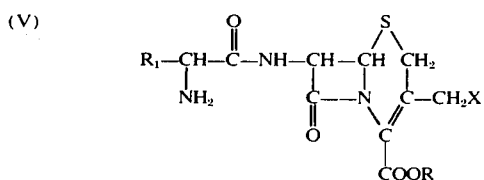

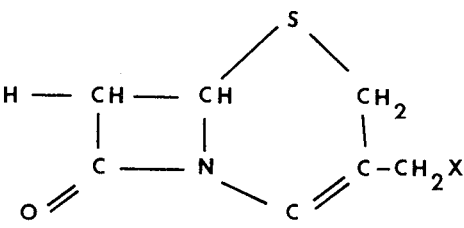

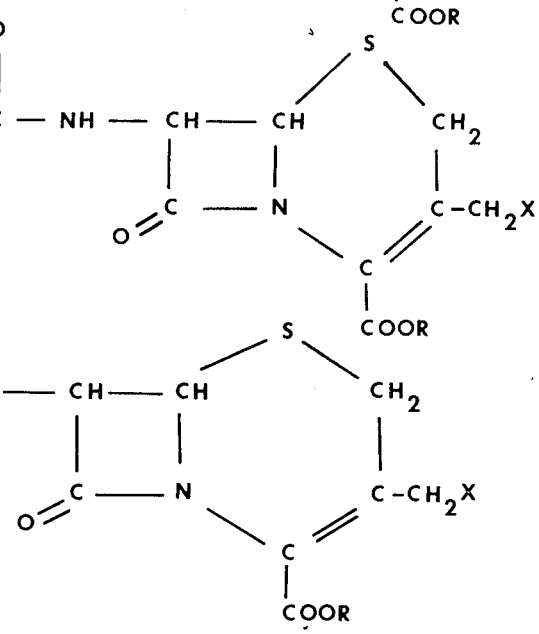

R and X have the same meaning described above but especially X is hydrogen or acetoxy, and R is hydrogen or sodium.

$R_3$ is hydrogen or a hydroxy, halogen, lower alkyl, lower alkoxy, lower alkanoyl or lower alkanoyloxy group such as those described above. $R_4$ is hydrogen, lower alkyl or lower alkoxy. $m$ is 1, 2 or 3 and $n$ is 0, 1, 2, 3 or 4. Most preferred are those compounds wherein $R_3$ and $R_4$ each is hydrogen, especially when $n$ is 0.

The compounds of formula I are produced by first forming a compound of the formula (V)

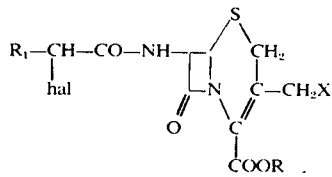

and then reacting the compound of formula V with dicyanogen or a cyanogen halide like cyanogen bromide or cyanogen chloride.

The reaction between the compound of formula V or its derivative may be effected, for example, by dissolving or suspending the substance in an inert organic medium such as methylene chloride, dimethylformamide, methanol or the like, along with an acid binding agent such as triethylamine, pyridine or the like, then adding the dicyanogen or cyanogen halide. A low temperature, e.g., about 0° to –20°C., is preferable. The product of the reaction is then isolated by conventional procedures, e.g., by concentration or evaporation of the solvent. Salts are prepared by conventional procedures.

As an alternative, a product of formula I may be produced by reacting cyanamide or an alkali metal cyanamide such as sodium cyanamide with a compound of the formula (VI)

under the conditions described above. R and $R_1$ are the same as defined above and hal is halogen preferably bromine or chlorine.

According to another alternative, a product of formula I may also be produced by reacting a compound of formula V with an N-cyano-2-pyridone [2-oxo-1(2H)-pyridinecarbonitrile] which is unsubstituted or substituted on the pyridine ring. The reaction occurs under mild conditions, e.g., at about room temperature in an inert organic solvent such as dimethylsulfoxide, dimethylformamide, methylene chloride or the like.

The N-cyano-2-pyridones may be those described in U.S. application Ser. No. 148,037, filed May 28, 1971, by William Lawrence Parker and Saul Lewis Neidleman, now U.S. Pat. No. 3,769,291 having the formula (VII)

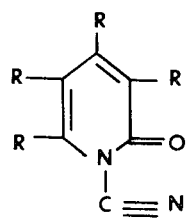

wherein each R may be the same or different and may be hydrogen, lower alkyl, lower alkenyl, hydroxy, lower alkoxy, cyano, halogen, carboxy, amido, mercapto, aliphatic or aromatic acyl radicals of up to 20 carbon atoms, phenyl, phenyl substituted by any of the foregoing groups, or aryloxy of up to 10 carbon atoms. These compounds may be prepared by reacting 2-acetoacetamidopyridine or a derivative thereof with an alkali metal nitrite at an acidic pH, e.g., about 2 to 4, or by reacting a salt of 2(1H)-pyridone or a derivative thereof, with a cyanogen halide such as cyanogen bromide.

When R is the acyloxymethyl group

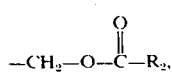

this group may be introduced onto 7-aminocephalosporanic acid moiety either prior to or subsequent to the reaction with the dicyanogen or cyanogen halide by treatment with one to two moles of a halomethyl ester of the formula

wherein hal is halogen, preferably chlorine or bromine, in an inert organic solvent such as dimethylformamide, acetone, dioxane, benzene or the like at about ambient temperature or below.

The products of this invention form salts which are also part of the invention. Basic salts form with the acid moiety as discussed above when the symbol R is hydrogen.

It will be appreciated that certain of the compounds of this invention exist in various states of solvation as well as in different isomeric or optically active forms. The various forms as well as their mixtures are within the scope of this invention.

Ordinarily the new compounds of this invention derived from D-α-amino acids, or derivatives thereof, are more active than the corresponding compound derived from the L-form or DL-form. The configuration of the α-carbon of the α-amino acid used in the synthesis is retained in the product.

Further process details are provided in the illustrative examples.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. The may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.1 to 1 percent by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same manner by appropriate substitution in the starting material.

EXAMPLE 1

2.5 g. of 7-(D-α-aminophenylacetamido)cephalosporanic acid together with 1.85 g. of triethylamine are dissolved in 25 ml. of dimethylformamide. The solution is cooled to −25° and a solution of 0.65 g. of cyanogen bromide in 10 ml. of absolute methanol is added dropwise at this temperature over a period of 20 minutes. This is stirred at −20° for one hour and then treated with 600 ml. of absolute ether. The viscous, greasy precipitate is washed twice with fresh absolute ether. This is then dissolved in a little methanol, the solution is filtered and the 7-[D-2-(cyanamino)-2-phenylacetamido]cephalosporanic acid is treated with 3 ml. of a 2N solution of potassium ethylhexanoate in n-butanol. The addition of ether to the resulting solution precipitates the potassium salt of 7-[D-2-(cyanamino)-2-phenylacetamido]cephalosporanic acid.

The crude potassium salt is stirred with about 20 ml. of methanol, filtered and the filtrate is again treated with ether. The precipitate is filtered under suction and dried under vacuum. 1.6 gm. of the potassium salt of 7-[D-2-(cyanamino)-2-phenylacetamido]-cephalosporanic acid are obtained, m.p. 249° (dec.)

EXAMPLE 2

0.42 g. (0.01 mol.) of cyanamid are dissolved in 10 ml. of 1N sodium methylate solution and the solution is evaporated to dryness under vacuum. The residue is taken up in 20 ml. of anhydrous dimethylformamide. The solution is cooled to −10° and to this are added, at this temperature, over a period of 20 minutes with stirring, a solution of 4.68 g. (0.01 mol.) of 7-[DL-(2-bromo)-2-phenylacetamido]cephalosporanic acid in 10 ml. of anhydrous dimethyl formamide. After stirring for 2 hours, 600 ml. of absolute ether are added. After standing for a while, the supernatant solvent is decanted from the precipitated product, 7-[DL-2-(cyanamino)-2-phenylacetamido]cephalosporanic acid. The residue is dissolved in a little methanol, treated with 6 ml. of a 2N solution of potassium ethylhexanoate in n-butanol, permitted to stand for one hour and filtered. The potassium salt of 7-[DL-2-cyanamino]-2-phenylacetamido]cephalosporanic acid is precipitated from the filtrate by the addition of ether.

EXAMPLE 3

By substituting 7-[D-2-amino-2-(1,4-cyclohexadien-1-yl)acetamido]cephalosporanic acid for the 7-(D-α-aminophenylacetamido)cephalosporanic acid in the procedure of Example 1, 7-[D-2-cyanamino-2-(1,4-cyclohexadien-1-yl)acetamido]-cephalosporanic acid and its potassium salt are obtained.

EXAMPLE 4

7-(D-α-amino-phenylacetamido)desacetoxycephalosporanic acid is substituted in the procedure of Example 1 for the 7-(D-α-aminophenylacetamido)cephalosporanic acid to obtain 7-(D-2-cyanamino-2-phenylacetamido)-3-desacetoxycephalosporanic acid and its potassium salt.

EXAMPLE 5

7-[D-α-amino-(1,4-cyclohexadien-1-yl)acetamido]-3-desacetoxycephalosporanic acid is substituted in the procedure of Example 1 to obtain 7-[D-2-cyanamino-2-(1,4-cyclohexadien-1-yl)acetamido]-3-desacetoxycephalosporanic acid.

EXAMPLE 6

7-[D-2-amino-3-(1,4-cyclohexadien-1-yl)propionamido]cephalosporanic acid is substituted in the procedure of Example 1 to obtain 7-[D-2-cyanamino-3-(1,4-cyclohexadien-1-yl)propionamido]cephalosporanic acid.

EXAMPLE 7

To obtain the triethylamine salt of 7-[D-2-(cyanamino)-2-phenylacetamido]cephalosporanic acid, an equivalent amount of triethylamine is added to an ethanol solution of 7-[D-2(cyanamino)-2-phenylacetamido]cephalosporanic acid and the reaction product is concentrated at reduced pressure to deposit the product.

The following additional products having the formula B of the table are obtained according to the procedure of Example 1 by substituting for the 7-[D-α-aminophenylacetamido]cephalosporanic acid the compound having the formula A of the table:

TABLE

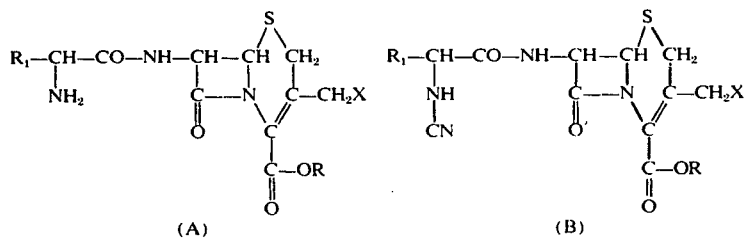

(A)  (B)

| Example | R | R₁ | X |
|---|---|---|---|
| 8 | CH₃ | H | H |
| 9 | C₂H₅ | CH₃ | OH |
| 10 | CH₃ | C₃H₇ | pyridinium |
| 11 | —CH₂OC(O)—CH(CH₃)₂ | C₆H₅CH₂— | OCOCH₃ |
| 12 | —CH₂OC(O)—C₆H₅ | 4—ClC₆H₄— | OCOCH₃ |
| 13 | C₂H₅ | 3,4—(CH₃O)₂C₆H₃— | H |
| 14 | C₂H₅ | 3,4,5—(CH₃O)₃C₆H₂— | OCOCH₃ |
| 15 | H | 4—CH₃C₆H₄— | OCOCH₃ |
| 16 | lactone (+X) | 3,4—(Br)₂C₆H₃CH₂— | lactone (+R) |
| 17 | C₂H₅ | 2,4—(Cl)₂C₆H₃— | OCOCH₃ |
| 18 | C₂H₅ | (C₆H₅-isoxazolyl-CH₃) | OCOCH₃ |
| 19 | C₂H₅ | (morpholino) | OCOCH₃ |
| 20 | C₂H₅ | (4-methylpyridin-2-yl) | OCOCH₃ |
| 21 | C₂H₅ | (thien-2-yl) | OCOCH₃ |
| 22 | C₆H₅CH₂— | (furan-2-yl) | —OOCH₂C₆H₅ |
| 23 | —CH₂OC(O)—CH(CH₃)₂ | C₆H₅— | H |
| 24 | —CH₂O—C(O)—CH(CH₃)₂ | C₆H₅— | —OOC—C₆H₅ |

TABLE - CONTINUED

| Example | R | R₁ | X |
|---|---|---|---|
| 25 | H | C₆H₅— | H |
| 26 | Na | C₆H₅— | H |
| 27 | CH₃O-C(=O)—CH(CH₃)₂ | C₆H₅— | —OCOCH₃ |
| 28 | —Si(CH₃)₃ | C₆H₅— | H |
| 29 | —N(C₂H₅)₃ | C₆H₅— | H |
| 30 | Na | C₆H₅— | OCOCH₃ |
| 31 | 1-adamantyl | H | H |
| 32 | 2-adamantyl | H | H |

| Example | R₁ | R | X |
|---|---|---|---|
| 33 | (phenyl) | K | H |
| 34 | CH₃CH=CH— | K | H |
| 35 | CH₃—CH=CH—CH₂ | H | OCOCH₃ |
| 36 | CH₃—CH—CH=CH— | H | OCOCH₃ |
| 37 | (thienyl, S) | K | H |

EXAMPLE 38

7-[D-2-amino-3-(4-methoxy-1,4-cyclohexadien-1-yl) propionamido]cephalosporanic acid is substituted in the procedure of Example 1 to obtain 7-[D-2-cyanamino-3-(4-methoxy-1,4-cyclohexadien-1-yl)propionamido]cephalosporanic acid.

EXAMPLE 39

7-[DL-2-amino-3-(4-methyl-1,4-cyclohexadien-1-yl)-propionamido]-3-desacetoxycephalosporanic acid is substituted as starting material in the procedure of Example 1 to obtain 7-[DL-2-cyanamino-3-(4-methyl-1,4-cyclohexadien-1-yl)propionamido]-3-desacetoxycephalosporanic acid.

EXAMPLE 40

A 0.1 molar solution of 7-[D-2-cyanamino-2-(1,4-cyclohexadienyl)acetamido]cephalosporanic acid is treated with 0.5 mole pyridinium acetate at pH 7 (the pH is adjusted to 7 with a few drops of aqueous pyridine solution) for several hours at room temperature. A rapid solvolysis occurs which can be followed by paper chromatography; when the disappearance of the starting material is complete, lyophilization provides good yields of the product, 7-[D-2-cyanamino-2-(1,4-cyclohexadien-1-yl)acetamido]-3-(1-pyridiniummethyl)-3-cephem-4-carboxylate.

EXAMPLE 41

7-(2-amino-n-valeramido)cephalosporanic acid is substituted as starting material in the procedure of Example 1, to obtain 7-(2-cyanamino-n-valeramido)cephalosporanic acid.

EXAMPLE 42

Sodium nitrite, 2 g., and 2-acetoacetamidopyridine, 1 g., are mixed with 200 ml of water. The mixture is then adjusted to pH 3.0 with acetic acid and cooled on ice. After 2 hours at 0°C, the solution is extracted with ethyl acetate and the extract dried (Na₂SO₄) and concentrated in vacuo. The active material is isolated by chromatography on silica gel using chloroform-methanol (49:1). Sublimation at 90°C and 0.02 mm followed by recrystallization from benzene-cyclohexane (4:1) gives 20 mg of 2-oxo-1(2H)-pyridinecarbonitrile, m.p. 100.5°–101.5°C.

2-Oxo-1(2H)pyridinecarbonitrile may also be prepared as follows:

A solution of 2(1H)-pyridone in one equivalent of 2 N aqueous sodium hydroxide is taken to dryness in vacuo and the residue is recrystallized from 95% ethanol, giving nacreous platelets of the hydrated sodium salt of 2(1H)-pyridone. A solution of the salt (10.8 g) in 260 ml of dimethylformamide (DMF) is added to a stirred solution of 130.0 g of cyanogen bromide in 10 ml of DMF at 0° over a period of 1.5 hours. After stirring for an additional 10 minutes at 0°, the DMF is removed in vacuo. The residue (dark brown) is dissolved as much as possible in chloroform, filtered, and the filtrate taken to dryness in vacuo. This residue is then dissolved in ethyl acetate and the solution is passed through a column of silica gel (300 g) to remove the bulk of the colored impurities. Removal of the solvent gives 7.65 g of solid that is then sublimed at 90°–100°C and 0.02 mm. Recrystallization of the sublimate (5.67 g) from benzene-cyclohexane (4:1) gives 4.24 g of pure 2-oxo-1(2H)-pyridinecarbonitrile, m.p. 100.5°–101.5°C.

2-Oxo-1(2H)pyridinecarbonitrile, 36 mg. and 0.02 ml. of pyridine are added to a solution of 100 mg. of 7-(D-α-aminophenylacetamido)cephalosporanic acid in 0.5 ml. of DMSO. After three and one-half hours at room temperature, this solution is poured into 50 ml.

of ethyl acetate. The solution is washed with 10 ml. portions of 0.1N HCl, and then with water and saturated NaCl solutions. After drying over $Na_2SO_4$, the ethyl acetate solution is evaporated to dryness in vacuo to deposit 7-[D-2-(cyanamino)-2-phenylacetamido]cephalosporanic acid.

EXAMPLE 43

A sterile powder for reconstitution for use intramuscularly is prepared from the following ingredients which supply 1,000 vials each containing 250 mg. of active ingredient:

| | |
|---|---|
| 7-[D-2-(cyanamino)-2-phenylacetamido]-cephalosporanic acid, sterile | 250 gm. |
| Lecithin powder, sterile | 50 gm. |
| Sodium carboxymethylcellulose, sterile | 20 gm. |

The sterile powders are aseptically blended and filled into sterile vials, and sealed. The addition of 1 ml. of water for injection to the vial provides a suspension for intramuscular injection.

What is claimed is:

1. A compound of the formula

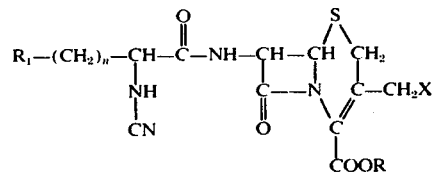

wherein R is hydrogen, lower alkyl, aralkyl, tri(lower alkyl)-silyl,

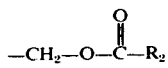

or a salt forming ion of the group consisting of aluminum, alkali metal, dibenzylamine, N,N-dibenzylethylenediamine, methylamine, triethylamine, procaine and N-ethylpiperidine; $R_1$ is morpholino, thienyl or furyl; $R_2$ is lower alkyl, aryl or aralkyl; X is hydrogen, hydroxy, lower alkanoyloxy, aroyloxy, lower alkylamine, dibenzylamine, pyridinium, 1-quinolinium, 1-picolinium, or together X and R represent a bond linking carbon and oxygen in a lactone ring; said aryl, aralkyl, aroyloxy and aralkanoyloxy being respectively, phenyl, phenyl-lower alkyl, phenoxy and phenyl-lower alkanoyloxy and said groups bearing on the phenyl, halo, lower alkyl, hydroxy, lower alkoxy, lower alkanoyl or lower alkanoyloxy; and $n$ is 0, 1, 2, 3 or 4.

2. A compound of the formula

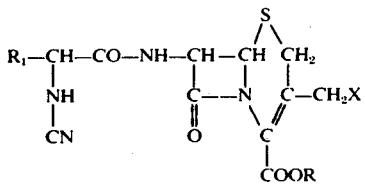

wherein R is hydrogen, lower alkyl or alkali metal; $R_1$ is morpholino, thienyl or furyl; and X is hydrogen or acetoxy.

3. A compound as in claim 2 wherein $R_1$ is morpholino.

4. A compound as in claim 2 wherein $R_1$ is thienyl.

5. A compound as in claim 2 wherein $R_1$ is furyl.

6. A compound as in claim 3 wherein R is ethyl and X is acetoxy.

7. A compound as in claim 4 wherein R is ethyl and X is acetoxy.

8. A compound as in claim 4 wherein R is hydrogen and X is acetoxy.

9. A compound as in claim 4 wherein R and X are hydrogen.

10. A compound as in claim 5 wherein R is benzyl and X is benzyloxy.

* * * * *

UNITED STATES PATENT AND TRADEMARK OFFICE
CERTIFICATE OF CORRECTION

PATENT NO. : 3,898,219
DATED : August 5, 1975
INVENTOR(S) : Hermann Breuer, Joseph Edward Dolfini, Raymond C. Erickson, William L. Parker It is certified that error appears in the above-identified patent and that said Letters Patent are hereby corrected as shown below:

In the Abstract -- line 5 -- the formula should be

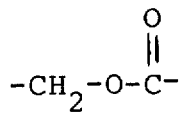

Signed and Sealed this twenty-seventh Day of April 1976

[SEAL]

Attest:

RUTH C. MASON
*Attesting Officer*

C. MARSHALL DANN
*Commissioner of Patents and Trademarks*